W. S. HALSEY.
I-BEAM TROLLEY.
APPLICATION FILED FEB. 26, 1921.
1,393,015.
Patented Oct. 11, 1921.
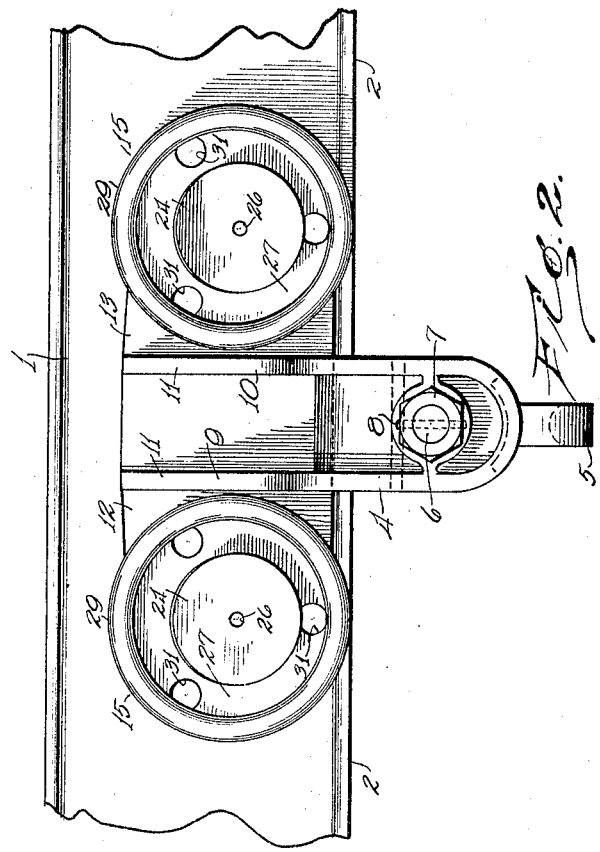
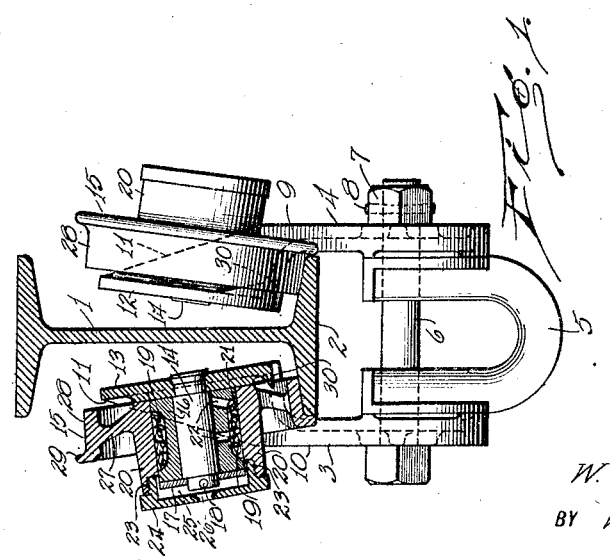
INVENTOR
W. S. Halsey
BY Munn & Co.
ATTORNEYS

UNITED STATES PATENT OFFICE.

WILLIAM S. HALSEY, OF DOVER, NEW JERSEY.

I-BEAM TROLLEY.

1,393,015.   Specification of Letters Patent.   Patented Oct. 11, 1921.

Application filed February 26, 1921. Serial No. 447,943.

*To all whom it may concern:*

Be it known that I, WILLIAM S. HALSEY, a citizen of the United States, and a resident of Dover, in the county of Morris and State of New Jersey, have invented a new and useful Improvement in I-Beam Trolleys, of which the following is a full, clear, and exact description.

My invention relates to overhead trolleys and it consists in the combinations, constructions and arrangements herein described and claimed.

An object of my invention is to provide an I-beam trolley having means partly disposed between the web of the I-beam and the adjacent end of a truck wheel for supporting the latter for rolling contact with the lower flange of the I-beam.

A further object of my invention is to provide a device of the type described that embodies a truck frame provided with means adapted to support a load and formed with portions extending over the lower flange of an I-beam between the web of the I-beam and a truck wheel for supporting the latter in position to have a rolling contact with the lower flange of the I-beam.

A further object of my invention is to provide a device constructed in the manner outlined above so that the journal pin carried by the truck frame for supporting the truck wheel can be reduced to a minimum and the frictional resistance on the device on account of the contact of the wheel with its journal reduced to a minimum without the necessity for providing anti-friction bearing about the journal.

A further object of my invention is to provide a device of the type described that is self-oiling and is provided with means for preventing the passage of the lubricating fluid from the device to the upper surface of lower flange of the I-beam.

Other objects and advantages will appear in the following specification, and the novel features of the invention will be particularly pointed out in the appended claims.

My invention is illustrated in the accompanying drawings, forming part of this application, in which—

Figure 1 is a section through an I-beam, showing the use and application of the device, a portion of the latter also being shown in section, and Fig. 2 is a side elevation of the mechanism shown in Fig. 1.

In overhead trolley constructions of which I am aware in which a truck is arranged for movement along an I-beam, the truck wheels having a rolling contact with the lower flange of the I-beam are supported by frame members engaging with the wheels at their remote sides; that is to say, the truck wheels are positioned between the supporting frame members and the web of the I-beam. In such constructions, it is necessary to provide journal pins of relatively large diameter for the truck wheels on account of the fact that the stress to which the journal pin is subjected when a load is suspended from the truck is applied to the journal pin at a point remote from the truck wheel and such stress tends to cause a flexure of the journal pin. Since it is essential that the frictional resistance on the device occasioned by the rolling contact of the journal with the wheel be reduced to a minimum, it has heretofore been necessary to arrange anti-friction bearings or the like relative to the journal pin in order to reduce the friction. An embodiment of my invention requires no anti-friction bearings to reduce the frictional resistance since the journal pin may be reduced in diameter to a minimum size when a given load is supported by a truck to which the journal pin is secured, since I provide truck frame members having portions thereof arranged between the truck wheels and the web of an I-beam so that the stress occasioned by a load subjects the journal pin to a shearing stress and not a flexure. In carrying out my invention, I make use of an I-beam 1 having a lower flange 2. The I-beam 1 is supported in an elevated position in an ordinary manner by means not shown to serve as a track along which a truck embodying my invention moves. Such a truck comprises a pair of precisely identical truck frame members 3 and 4 that are arranged at opposite sides of the I-beam 1 and are arranged to straddle the arms of a clevis 5, being secured thereto and maintained in spaced apart relation by a bolt 6 that is projected through registering openings in the lower portions of the truck frame members 3 and 4 and the arms of the clevis 5. The bolt 6 has a nut 7 secured thereon and this nut is locked in adjusted position in any suitable manner as by means of a pin 8. The truck frame members 3 and 4 are precisely identical and the parts carried by each above the level of the lower flange 2 are likewise precisely identical with corresponding parts carried by the other frame member. I have therefore applied like reference numerals to the like parts carried by the two frame members and shall confine my description to the truck frame member 3 and the parts carried thereby.

The truck frame member 3 is formed with vertically extending parallel strengthening ribs 9 and 10 and is inclined inwardly or toward the web of the I-beam at 11, as best seen in Fig. 1. Integral wing portions 12 and 13 extend in opposite directions from the inclined upper portion of the truck frame member 3 and these wing portions are inclined slightly to the perpendicular, the angle of inclination being determined by the slope of the upper surface of the flange 2. Each of the wing extensions 12 and 13 has an outwardly extending journal pin 14 secured thereto to extend parallel with the upper surface of the flange 2 and at right angles to the wing member. Each of the journal pins 14 has mounted thereon a truck wheel 15, the rim portion of which has a rolling contact with the upper surface of the I-beam flange 2 along the edge thereof.

Each of the truck wheels 15 embodies an inner hub member 16 that is mounted for rotation on the journal pin 14, being maintained thereon by a disk 17 that is slipped over the outer end of the journal pin and is maintained in position by a pin 18 projected through the journal pin 14 adjacent its outer end. The inner hub 16 is fashioned with an annular recess 19 in its outer wall to provide a reservoir for a lubricating substance when an outer hub member 20 is mounted on the inner hub 16 and rigidly secured thereto as by having a friction tight fit therewith. An absorbent material, such as waste 21 is disposed within the recess 19, and passages 22 lead from the recess 19 to the inner bore of the inner hub member 16. The outer hub member 21 projects beyond the outer end of the inner hub member and is threaded interiorly at 23 to receive a hub cap 24. It will be noted that a space 25 is thus provided between the inner wall of the hub cap 24 and the disk 17. The hub cap 24 is formed with a central opening 26 therethrough. The outer hub member 20 is integral with a web 27 that is integral with a rim 28 arranged to have a rolling contact with the upper surface of the flange 2. The rim 28 has a rim flange 29 adapted to the outer edge of the flange 2.

From the foregoing description of the various parts of the device, the operation thereof may be readily understood. In service, a load is suspended from the clevis 5 and is transported in the direction of the length of the I-beam 1 by pushing or pulling the load, or the truck wheels 15 may be driven by suitable mechanical means connected therewith. It is essential that the resistance on the journal pins 14 be reduced to a minimum in order that the load may be transported readily. The stress applied to the journal pins 14 by a load suspended from the clevis 5 will be transmitted through the truck frame members to the journal pins 14 at the point of their connections with the wing extensions 12 and 13, which is substantially identical with the direction of the stress in passing from the journal pin through the hub members and the webs and treads of the wheels 15 to the track. Consequently, the stress to which the journal pins 14 are subjected is a shearing stress and it is therefore only necessary to provide journal pins having sufficient strength to withstand the shearing stress these pins will be subjected to by a given load and the journal pins 14 may therefore be smaller in size than the journal pins required in overhead trolley devices of an ordinary construction to support the same load. The truck is therefore more simple in construction and lighter in weight than is ordinary and no anti-friction bearings are necessary in order to reduce the resistance on the device, as of course, the frictional resistance is reduced directly as the journal pins 14 are reduced in size.

The device is also self-oiling. Oil or other lubricant is introduced into the space between the hub cap 24 and the inner hub member 16 through the opening 26 and a sufficient supply of the lubricating fluid is placed in this space to fill the same to a level slightly below the opening 26. It will be observed that the level of the lubricating substance is higher than the bore of the inner hub 16 at the outer end thereof, although lower than the bore of inner hub 16 at its inner end. A portion of the journal pin 14 is consequently submerged in lubricating fluid and the substance disposed in the recess 19 also becomes saturated with the lubricating fluid which is fed slowly through the openings 22 to the journal pins 14. In the operation of the device, a certain quantity of the oil will pass along the journal pins 14 to the outer walls of the wing extensions 12 and 13 and will travel downwardly on such walls. It is important that this oil or lubricating substance be prevented from dropping on the upper surface of the flange 2, to subsequently pass between the tread of the wheel 15 and the flange 2 and thus to interfere with the traction of the device and to this end the portion of each wing extension positioned beneath each of the wheels 15 is formed with an outwardly extending lip 30 along its lower edge. The oil passing outwardly along the outer walls of the wing extensions is conducted along the lips 30 into contact with the web portions of the wheels, thence through the openings 31 in the webs to the outer side thereof and beyond the outer edges of the flange 2. Consequently, none of the oil used in lubricating the device can pass to the upper surface of the flange 2 of the I-beam to interfere with the traction of the device when the wheels are driven by a suitable mechanism connecting therewith.

I claim:

1. The combination with an I-beam supported in elevated position, of a truck having a pair of frame members arranged with their upper portions disposed between the flanges of the I-beam at opposite sides of its web, a pair of rotatable truck wheels, means projecting from the remote sides of said truck frame members and connecting with the truck wheels, said truck wheels being positioned to have a rolling contact with the lower flange of said I-beam, and means connecting the frame members adjacent their lower ends and adapted for connection with a load.

2. The combination with an elevated track having a vertical web and a lower flange, of a truck having a pair of truck wheels arranged at opposite sides of the web for movement along the upper surface of the flange, a frame comprising members having portions arranged between the opposite sides of the web and the wheels and connecting with the latter, each of said frame members being formed to provide a portion adapted to depend below the I-beam flange, and means connecting the depending portions of the frame members and adapted for connection with load supporting means.

3. The combination with an I-beam supported in elevated position, of a truck comprising a frame having portions arranged to extend over the lower flange of the I-beam at opposite sides of the I-beam web and a wheel carried by each of said upper portions laterally of its side remote from the I-beam web and arranged for movement along the upper surface of the lower flange of the I-beam.

4. The combination with an elevated track comprising a horizontally extending I-beam having its web disposed in vertical position, of a device of the character described comprising a frame having a body portion disposed below the I-beam and having frame members arranged to extend above the plane of the lower flange of the I-beam at opposite sides of the latter, each of said frame members being formed to incline above the lower flange of I-beam toward the web of the I-beam, each of said inclined portions of the frame members being formed with a pair of alined extensions at opposite sides thereof, a journal pin rigidly secured to each extension to extend laterally of the side of the latter remote from the I-beam web, a wheel rotatably mounted on each journal pin and arranged to have a rolling contact with the upper surface of the lower flange of the I-beam.

5. The combination with an overhead track comprising an I-beam of a device of the character described, a frame consisting of a body portion arranged below the I-beam and having frame members extending above the lower flange of the I-beam at opposite sides of the web, said frame members being formed with their upper portions converging above the lower flange of the I-beam, journal pins secured to said inclined portions of the frame members to project oppositely from the remote walls thereof parallel with the upper surface of the lower flange of the I-beam, a wheel rotatably mounted on the projecting portion of each journal pin and arranged to engage the upper surface of the lower flange of the I-beam, said wheels being formed each with a reservoir in its hub portion for a lubricant, said reservoir being arranged relative to said journal pin to feed a lubricant to the latter at the outer end thereof, said frame members each being formed with an outwardly extending lip arranged beneath the hub of each wheel to receive any lubricant dropping from the inner end of the journal pin to prevent the passage of the lubricant to the upper surface of the lower flange of the I-beam.

6. The combination with a horizontally disposed elevated I-beam, of a pair of wheels, each having a tread portion adapted to the upper surface of the lower flange of the I-beam and means connecting with the wheels at the sides thereof adjacent to the web of the I-beam for maintaining the wheels in rolling contact with the lower flange of said I-beam.

7. The combination with a horizontally disposed elevated I-beam, of a pair of wheels, each having a tread portion adapted to the upper surface of the lower flange of the I-beam and means connecting with the wheels at the sides thereof adjacent to the web of the I-beam for maintaining the wheels in rolling contact with the lower flange of said I-beam and extending below the I-beam for connection with a load.

WILLIAM S. HALSEY.

Witnesses:
 HARRY H. NIXON,
 JOHN W. HENNESEY.